Feb. 14, 1933. J. ZUBATY ET AL 1,897,966
MOUNTING PLATE AND FACE ASSEMBLY
Filed June 27, 1931
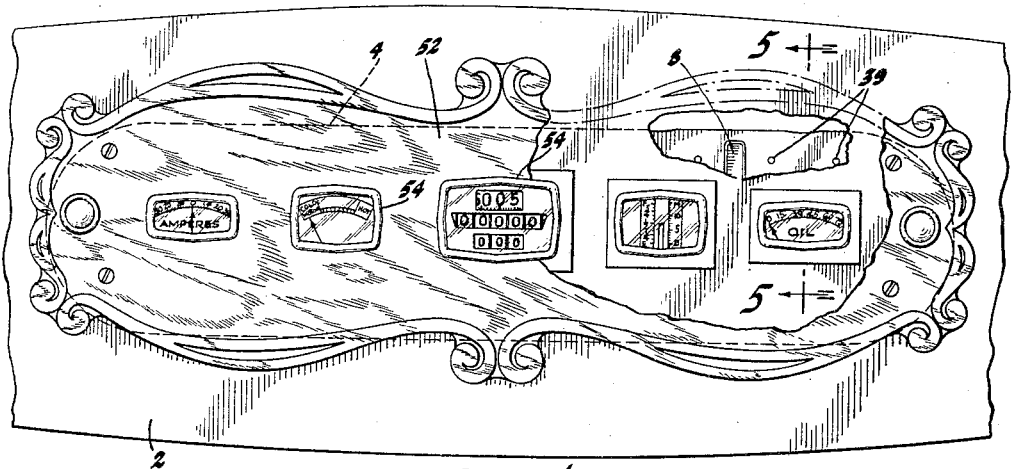
Fig. 1
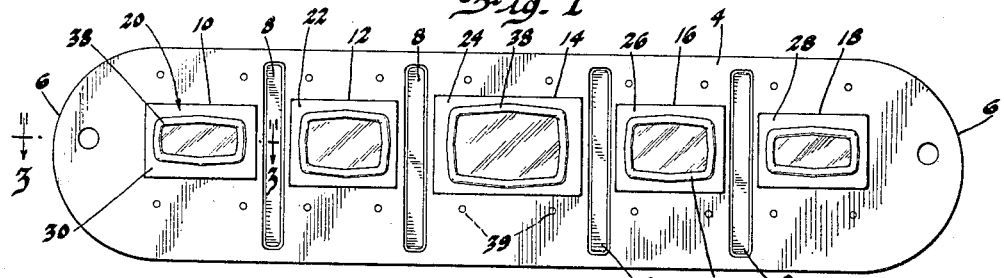
Fig. 2
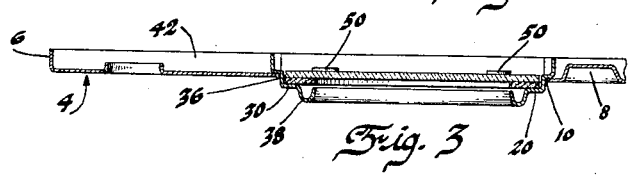
Fig. 3
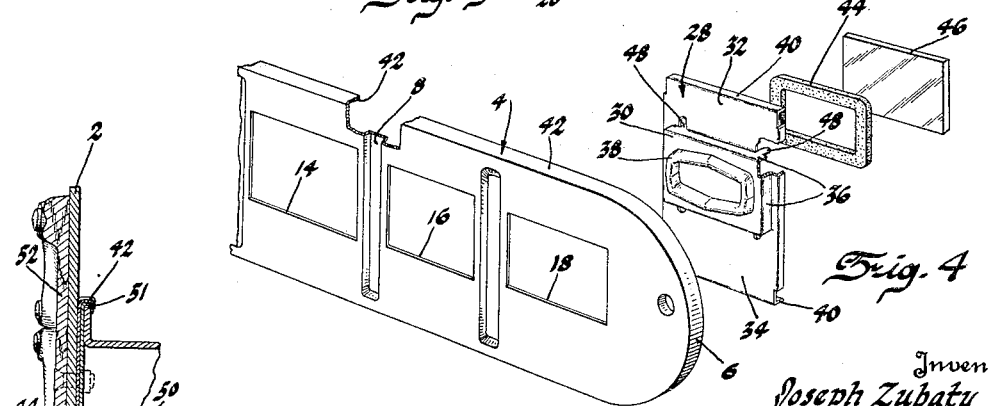
Fig. 4
Fig. 5
Inventors
Joseph Zubaty &
Don E. Keeney
By Blackmore, Spencer & Hirsh
Attorneys Patented Feb. 14, 1933

1,897,966

UNITED STATES PATENT OFFICE

JOSEPH ZUBATY AND DON E. KEENEY, OF FLINT, MICHIGAN, ASSIGNORS TO A C SPARK PLUG COMPANY, OF FLINT, MICHIGAN, A COMPANY OF MICHIGAN

MOUNTING PLATE AND FACE ASSEMBLY

Application filed June 27, 1931. Serial No. 547,230.

This invention relates to instrument panels and has particular reference to instrument panels applied to the instrument boards of automotive vehicles.

The invention has for its object to construct an instrument panel of stampings of relatively thin metal and thereby effect economies in production cost and ease in assembly which have proved to be of great advantage over prior constructions.

The instrument panel of the invention comprises a metal sheet, preferably rounded at its ends and having a plurality of ribs pressed therefrom intermediate its ends to add strength to the panel. The panel is also provided with a plurality of axially arranged openings through each of which a bezel projects outwardly away from the plane of the panel. Each bezel has laterally extending wing portions which project above and below the bezel and fit tightly against the panel back where they are spot welded in place. Glass windows are placed at the backs of the bezels. Integral tongues pressed from the bezel wings are bent over the windows and hold them in place. The instrument board is formed with openings of a size and number adapted to receive the bezels and when in position on the instrument board, the bezels will be substantially flush, or in the same plane with the instrument board. A decorative or embellishment plate may now be placed on the panel to cover the bezels outside of the usual bead and the joint between the bezels and panel.

On the drawing:

Figure 1 is a view of the instrument board of an automotive vehicle with the novel panel in place, parts being broken away for purposes of clearer illustration.

Figure 2 is a front view of the panel per se separated from the instrument board.

Figure 3 is a sectional view in the line 3—3 of Figure 2.

Figure 4 is an expanded view of the parts.

Figure 5 is a sectional detail.

Referring to the drawing, 2 designates the instrument board of a vehicle and 4 the novel panel of the invention. The panel includes a plate which is preferably rounded at its ends as indicated at 6 and has a plurality of ribs 8 pressed vertically along its length to give it added stiffness. A plurality of openings 10, 12, 14, 16 and 18 are formed in the panel along its center line and one of the ribs 8 is preferably placed between each pair of openings.

The panel has a plurality of bezels 20, 22, 24, 26 and 28, fitting in the openings 10, 12, 14, 16 and 18, respectively. Each bezel comprises the raised portion 30, the wing portions 32 and 34, the connecting portion 36, and the ornamental outwardly projecting bead 38. Each bezel is provided with a central opening to render visible the instrument face. The raised portion 30 of the bezels is formed exactly to fit the openings 10, 12, 14, 16, or 18, in the panel and to project outwardly and away therefrom by a thickness equal to the thickness of the instrument board. The wing portions extend above and below the opening and tightly fit against the back of the instrument panel extending from top to bottom thereof and are spot welded thereto as indicated at 39. At their ends the wings are flanged as shown at 40 to correspond to a flange 42 which extends entirely around the ends of the panel to give it added stiffness.

Within the recess formed by the projecting portions of the bezels and which extends through the panel openings, there is positioned a gasket 44 and a glass window 46. The bezel has a plurality of tongues 48 pressed from the wing portions at the window edge and the window is held in place by bending these tongues over the window edge as shown at 50. The panel is fastened to the instrument casings by crimping the panel edge over onto the casings as shown at 51 in Figure 5.

When the panel is placed in the instrument board the board will have openings corresponding to the openings 10, 12, 14, 16 and 18 and the projecting portions of the bezels will extend through the openings and leave a substantially coplanar surface between the outer plane of the bezel projections and the outer surface of the instrument board. A decorative or embellishing panel or sheet 52 may now be applied and have openings 54 which correspond in shape to the outline of the raised ornamental ribs 38 of the bezels. This decorative panel will therefore cover all of the exposed portion of the bezel around the rib 38, as well as the joint between the bezel and instrument board.

From the above description, it will be evident that by using a bezel plate with a differently shaped rib and defining a different sized opening, it is possible to make a wide range of variations in appearance of the instruments, the decorative panel 52 being changed by changing the shape of the openings to go around the ribs 38.

We claim:

1. In an instrument panel, a plate having a plurality of openings arranged along its center line, a plurality of bezels, one for each opening, spot welded to the back of the panel and having projecting portions extending through the openings and projecting away from the panel, a glass in each bezel over the opening therein, a plurality of tongues pressed from the bezel and bent over said glass to hold it in position, a strengthening flange around the bezel, strengthening ribs between each pair of openings, an instrument board on which the panel is placed, said board having openings conforming to the openings in the panel, said bezels projecting through said openings to a substantially coplanar position.

2. The combination of an instrument board having a plurality of apertures therein for the display of instruments, an instrument panel comprising a plate mounted at the rear of the panel having apertures therein alining with the apertures in the panel, instruments mounted at the rear of the panel provided with bezels having forwardly projecting portions extending within and fitting said alined apertures, said bezels being provided with forwardly projecting portions lying within said first-named forwardly projecting portions and a finishing plate overlying said panel and having apertures therein fitting said last-named forwardly projecting portions.

3. The combination of an instrument board having a plurality of apertures therein for the display of instruments, an instrument panel comprising a plate mounted at the rear of the panel having apertures therein alining with the apertures in the panel, instruments mounted at the rear of the panel provided with bezels having forwardly projecting portions extending within and fitting said alined apertures, said bezels being provided with forwardly projecting portions lying within said first-named forwardly projecting portions and a finishing plate overlying said panel and having apertures therein fitting said last-named forwardly projecting portions, transparent covers mounted within the forwardly projecting portions of said bezels, said bezels being provided with integral tabs bent over to hold said covers in position.

4. The combination of an instrument board having a plurality of apertures therein for the display of instruments, an instrument panel comprising a plate mounted at the rear of the panel having apertures therein alining with the apertures in the panel, instruments mounted at the rear of the panel provided with bezels having forwardly projecting portions extending within and fitting said alined apertures, said bezels being provided with forwardly projecting portions lying within said first-named forwardly projecting portions and a finishing plate overlying said panel and having apertures therein fitting said last-named forwardly projecting portions, said plate being provided with vertical stiffening ribs pressed rearwardly therefrom and lying between said openings.

5. The combination of an instrument panel having an opening therein, an instrument housing, a bezel secured to the front of the housing provided with a forwardly projecting stepped portion adapted to fit the opening in the panel, said stepped portion being provided with a second forwardly projecting stepped portion within the first-named portion, and a finishing plate secured to the front of the panel having an opening therein fitting said second-named forwardly projecting portion.

6. The combination of an instrument panel having an opening therein, an instrument housing, a bezel secured to the front of the housing provided with a forwardly projecting stepped portion adapted to fit the opening in the panel, said stepped portion being provided with a second forwardly projecting stepped portion within the first named portion, and a finishing plate secured to the front of the panel having an opening therein fitting said second-named forwardly projecting portion, a transparent cover mounted within said first-named forwardly projecting stepped portion, and means for holding said cover in position.

In testimony whereof we affix our signatures.

JOSEPH ZUBATY.
DON E. KEENEY.